(12) United States Patent
Opferman et al.

(10) Patent No.: US 11,734,079 B2
(45) Date of Patent: *Aug. 22, 2023

(54) METHODS OF HARDWARE AND SOFTWARE-COORDINATED OPT-IN TO ADVANCED FEATURES ON HETERO ISA PLATFORMS

(71) Applicant: Intel Corporation, Santa Clara, CA (US)

(72) Inventors: Toby Opferman, Beaverton, OR (US); Eliezer Weissmann, Haifa (IL); Robert Valentine, Kiryat Tivon (IL); Russell Cameron Arnold, Fountains Hills, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,175

(22) Filed: Aug. 5, 2022

(65) Prior Publication Data

US 2022/0374278 A1 Nov. 24, 2022

Related U.S. Application Data

(63) Continuation of application No. 16/586,706, filed on Sep. 27, 2019, now Pat. No. 11,409,572.

(51) Int. Cl.
*G06F 9/50* (2006.01)
*G06F 9/38* (2018.01)
(Continued)

(52) U.S. Cl.
CPC ........ *G06F 9/5055* (2013.01); *G06F 9/30098* (2013.01); *G06F 9/30101* (2013.01); *G06F 9/3885* (2013.01); *G06F 9/449* (2018.02); *G06F 9/4806* (2013.01); *G06F 9/4881* (2013.01); *G06F 9/5044* (2013.01)

(58) Field of Classification Search
None
See application file for complete search history.

(56) References Cited

U.S. PATENT DOCUMENTS

2009/0070553 A1 3/2009 Wallach et al.
2010/0115237 A1 5/2010 Brewer et al.
(Continued)

OTHER PUBLICATIONS

Extended European Search Report for EP Application No. 20182013.1 dated Jan. 13, 2021.
(Continued)

*Primary Examiner* — Qing Yuan Wu
(74) *Attorney, Agent, or Firm* — Fletcher Yoder, P.C.

(57) ABSTRACT

The present disclosure relates to a processor that includes one or more processing elements associated with one or more instruction set architectures. The processor is configured to receive a request from an application executed by a first processing element of the one or more processing elements to enable a feature associated with an instruction set architecture. Additionally, the processor is configured to enable the application to utilize the feature without a system call occurring when the feature is associated with an instruction set architecture associated with the first processing element.

16 Claims, 4 Drawing Sheets

(51) Int. Cl.
*G06F 9/48* (2006.01)
*G06F 9/30* (2018.01)
*G06F 9/448* (2018.01)

(56) References Cited

U.S. PATENT DOCUMENTS

| | | |
|---|---|---|
| 2012/0013627 A1* | 1/2012 | Shah .................... G06F 1/3203 |
| | | 345/522 |
| 2014/0082630 A1 | 3/2014 | Ginzburg et al. |
| 2014/0189317 A1 | 7/2014 | Ben-Kiki et al. |
| 2014/0189332 A1 | 7/2014 | Ben-Kiki et al. |
| 2015/0007196 A1 | 1/2015 | Toll et al. |
| 2015/0277863 A1 | 10/2015 | Gschwind et al. |
| 2018/0232330 A1 | 8/2018 | Weissman et al. |
| 2019/0102221 A1 | 4/2019 | Ananthakrishnan et al. |

OTHER PUBLICATIONS

Extended European Search Report for EP Application No. 20182013.1 dated Mar. 13, 2023.

* cited by examiner

METHODS OF HARDWARE AND SOFTWARE-COORDINATED OPT-IN TO ADVANCED FEATURES ON HETERO ISA PLATFORMS

CROSS-REFERENCE TO RELATED APPLICATIONS

This application is a continuation of U.S. patent application Ser. No. 16/586,706, filed Sep. 27, 2019, entitled "Methods of Hardware and Software-Coordinated Opt-In to Advanced Features on Hetero ISA Platforms," which is hereby incorporated by reference in its entirety for all purposes.

BACKGROUND

This disclosure relates to the control of processors, and, more specifically, relates to techniques that enable features to be opted into and out of in portions of a processor that are capable of providing different features.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

A processor may execute instructions from an instruction set such as an instruction set architecture (ISA). The instruction set is the part of the computer architecture related to programming, and generally includes the native data types, instructions, register architecture, addressing modes, memory architecture, interrupt and exception handling, and external input and output (I/O). Instruction sets may also define functions, features, or capabilities that a particular processor or portion of a processor (e.g., a core) can provide.

Processors may execute software instructions to perform various tasks, such as to run an operating system as well as programs or applications. In some cases, an application being executed may perform a system call in which the application may, for example, request that a kernel of an operating system provide a service, schedule a task to be performed by the processor, etc. Performing such system calls may reduce the efficiency of a processor. For instance, in response to a system call, a processor may stop performing one task in order to address the system call. At a later time, the processor may resume performing the task. Accordingly, reducing the number of system calls a processor addresses may facilitate the development of faster, more efficient processors.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
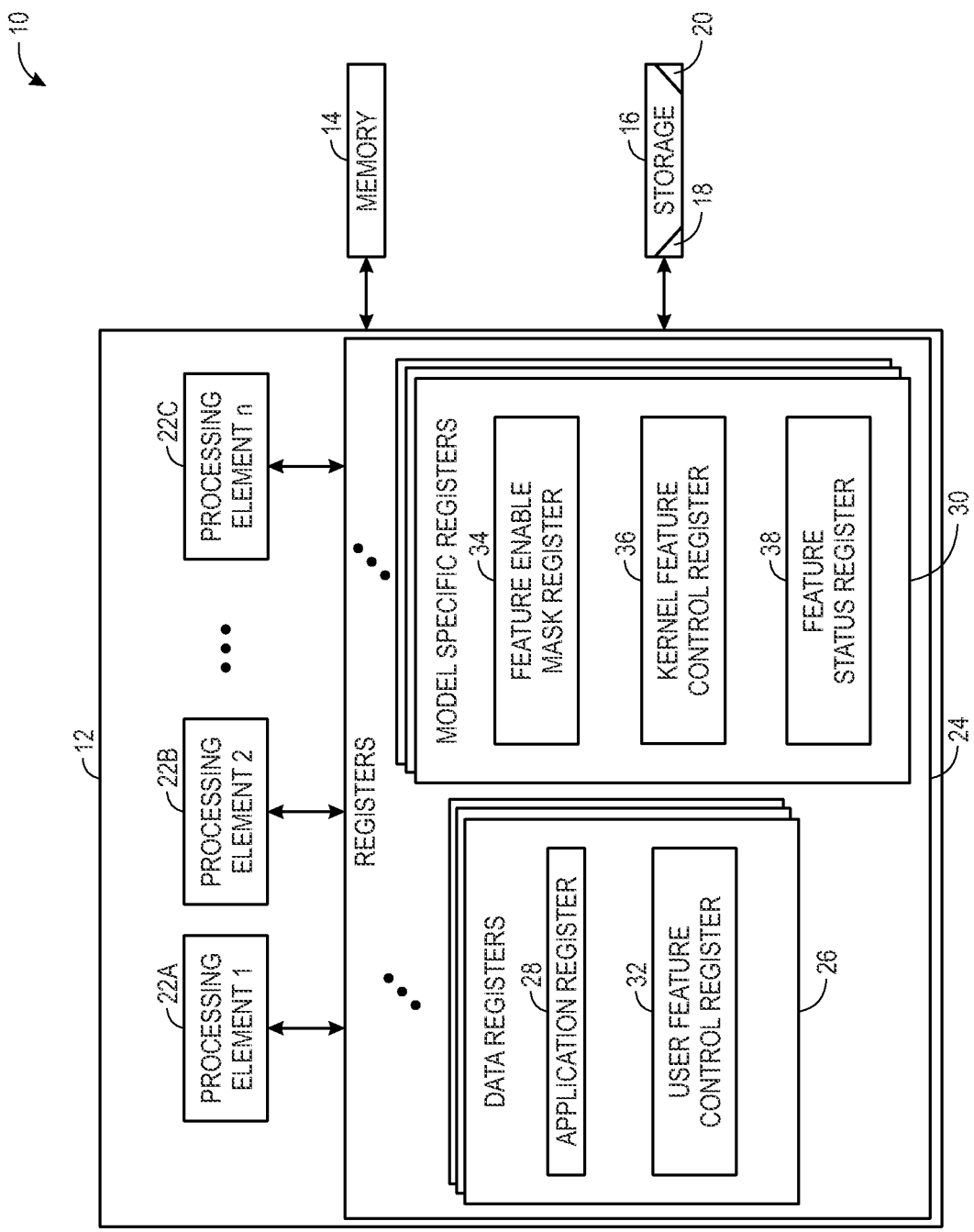
FIG. 1 is a block diagram of a processor that includes various registers, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

A processor (e.g., having one or more cores) may execute instructions (e.g., a thread of instructions (software thread)) to operate on data, for example, to perform arithmetic, logic, or other functions. For example, software may request an operation to be performed, and a hardware processor (e.g., one or more cores thereof) may perform the operation in response to the request. In certain embodiments, multiple operations are accomplished with the execution of a single instruction. In one embodiment, a logical processing element (e.g., a core) of a processor is to execute each thread of instructions. It should be noted that the term "instruction" herein may refer to a macro-instruction (e.g., an instruction that is provided to the processor for execution) or to a micro-instruction (e.g., an instruction that results from a processor's decoder decoding macro-instructions).

A processor may include several logical processing elements (e.g., cores), which may be associated with different instruction set architectures. In other words, different cores of a processor may have different capabilities. For instance, one core with a first instruction architecture set may be able to make different calculations or determinations than another core associated with another instruction set architecture. When there are different instruction set architectures associated with different processors or portions of a processor (e.g., different cores), this may be referred as a "heterogeneous environment," which signifies that the components in the environment (e.g., cores within a single processor or multiple processors that are communicatively coupled to one another) support multiple instruction set architectures.

A process (e.g., software thread) may be addressed using a core of the processor. For example, a core may perform calculations called for by software, such as an application that is executed by a processor. In some cases, the software may request a particular instruction set architecture be used. For example, to perform certain types of calculations or to make certain types of determinations, a particular instruction set architecture may be needed.

As described herein, processors may include particular registers that enable "opt-ins" and "opt-outs" to be performed. As discussed below, an opt-in generally refers to when a particular feature (e.g., instruction set architecture) is requested. For example, an application may request to opt into a particular instruction set architecture, such as an instruction set architecture that is associated with optional features or functions that a processor or core thereof can provide. The processor can be configured to enable the instruction set architecture (e.g., feature) to be provided, at which point it may be said that the feature has been opted into. Additionally, software may also request a feature be opted out of, meaning that the processor is configured to no longer provide the instruction set architecture. As described herein, a feature may be opted into (and opted out of) without performing a system call, which may increase the efficiency and processing speed of a processor.

Keeping the foregoing in mind, FIG. 1 illustrates a system 10 that includes a processor 12, memory 14, and storage device 16. As depicted, the processor 12 is communicatively coupled to the memory 14 and the storage device 16. The processor 12 may be various types of processors, such as, but not limited to a microprocessor, a digital signal processor (DSP), a microcontroller, or an application specific integrated circuit (ASIC).

The processor 12 may execute programs or instructions stored on a suitable article of manufacture, such as the memory 14 and/or the storage device 16. For example, the storage device 16 may include an operating system (OS) 18 and one or more applications 20 that the processor 12 may execute. In addition to instructions for the processor 12, the memory 14 and/or the storage device 16 may also store data to be processed by the processor 12. By way of example, the memory 14 may include random access memory (RAM) and the storage device 16 may include read only memory (ROM), rewritable non-volatile memory such as flash memory, hard drives, optical discs, or the like.

The processor 12 may include one or more processing elements 22 (e.g., a first processing element 22A, a second processing element 22B, and an $n^{th}$ processing element 22C, where n is an integer greater than two). The processing elements 22A-C may be a cores of the processor 12. For example, in embodiments in which the processor 12 is a quad-core processor, the processor 12 includes four cores (e.g., four processing elements 22).

The processor 12 may also include registers 24, which may include one or more data registers 26 to perform operations in, for example, in addition to or as an alternative to accessing data in the memory 14. For instance, the data registers 26 may include one or more application registers 28 that may be utilized to store data associated with the application 20 when the processor 12 is executing the application 20. The registers 24 may also include one or more model specific registers 30, which may be configuration and/or control registers. In some embodiments, the model specific registers 30 are typically only written to at the request of the OS 18 running on the processor 12. For example, in some cases, when the OS 18 or processor 12 is operating in a privileged mode (e.g., a kernel mode) and does not operate in non-privileged mode (e.g., a user mode), the model specific registers 30 may be written. Registers included in the data registers 26 (e.g., a user feature control register 32) and the model specific registers 30 (e.g., a feature enable mask register 34, kernel feature control register 36, and feature status register 38) are discussed below in more detail.

Additionally, some of the registers 24 may be associated with a particular processing element 22. For example, the first processing element 22A may utilize one set of data registers 26 and one set of model specific registers 30, while the second processing element 22B may utilize different data registers 26 and different model specific registers 30 than the first processing element 22A. In other words, particular data registers 26 and model specific registers 30 may be allocated to or used by particular processing elements 22A-C. For example, if a process (e.g., software thread) related to the application 20 is being is being performed by the first processing element 22A, the first processing element 22A may use the application register 28 of a particular data register 26.

As noted above, the processing elements 22A-C may support different instruction set architectures, which means that some of the processing elements 22 may be able to perform certain functions that others of the processing elements 22 may not be able to perform. As discussed herein, various registers may be utilized to enable the application 20 to "opt in" and "opt out" of various features or functions supported by instruction set architectures. For example, the application 20 may be executed using the first processing element 22A, which may be associated with or support a first instruction set architecture. In some cases, the application 20 may call for using a particular instruction set architecture or function provided by a particular instruction set architecture. For example, to perform a certain task, the application 20 may need to utilize a particular instruction set architecture or function provided by a particular instruction set architecture in order for the task to be completed. As discussed below, the registers 24 may be utilized to enable the application 20 or a process (e.g., software thread) associated with the application 20 to enable a processing element (e.g., first processing element 22A) that is executing the application 20 to provide a requested function (e.g., if the first processing element 22A can provide the requested function) and to decide whether to execute the application 20 using another processing element (e.g., second processing element 22B), for example, when the first processing element 22A does not support a requested instruction set architecture. With this in mind, the registers 24 will be discussed in more detail.

As illustrated, the model specific registers 30 may include one or more feature enable mask registers 34, which may define particular features that the OS 18 will allow the application 20 to enable. For example, the feature enable mask register 34 may include bits associated with particular features supported by an instruction set architecture that may be defined as a logical zero or a logical one to define whether each feature can be utilized. In other words, the OS 18 (e.g., via an operating system kernel) may determine features that a processing element 22 can provide and which of the features that can be provided the application 20 will be allowed to utilize. For example, in some cases, while an instruction set architecture may enable a processing element 22 to provide two different features, the two features may be conflicting features that cannot be provided at the same time.

Accordingly, the feature enable mask register 34 may define which features applications 20 may utilize.

Figure 2:
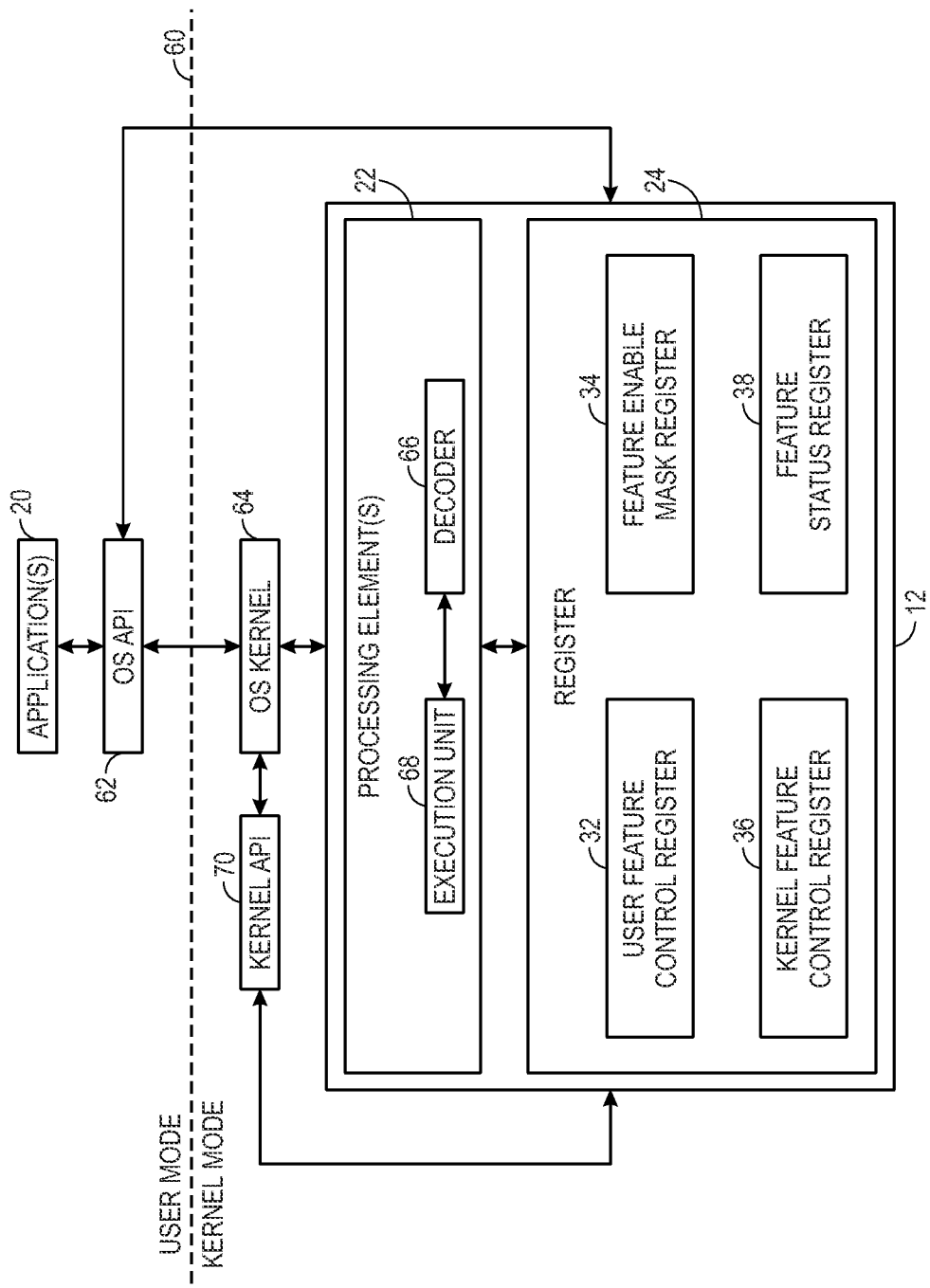
FIG. 2 is a block diagram of a schematic diagram illustrating the processor of FIG. 1 and various software components executed by the processor of FIG. 1, in accordance with an embodiment.

To help illustrate, FIG. 2 is provided. In particular, FIG. 2 is a schematic diagram illustrating how various software components executed by the processor 12 may interact with one another (and the processor 12 itself). However, before discussing the software components, it should be noted that FIG. 2 includes a line 60. Software components found above the line 60 may be said to be "user mode" software components, where software components located beneath the line 60 may be said to be "kernel mode" components. Generally speaking, the processor 12 may operate in a user mode and a kernel mode. Typically, user mode, is more restrictive than kernel mode, meaning that code being executed (e.g., user programs such as the application 20) typically has relatively less access to hardware (e.g., the processor 12, memory 14) compared to kernel mode. Conversely, in kernel mode, there is typically more access to the processor 12 and memory 14. As an example, functions of the OS 18 are often performed while the processor 12 is in kernel mode.

As illustrated, the user mode software components include the application(s) 20 and an operating system application programming interface (OS API) 62, which may communicate with one another. For instance, to request access to a function, the application 20 may request access from the OS API 62. In general, the OS API 62 may be a set of functions that enables communication between different software components. In other words, the OS API 62 may serve as an intermediary between the application 20 and an operating system kernel 64, which is a kernel mode software component. The OS kernel 64 may be software that manages operations of the processor 12 and memory 14. For example, the OS kernel 64 may be a part of the OS 18 that is used to control the OS 18 and hardware components used to run the OS 18 (e.g., the processor 12 and the memory 14). In particular, the OS kernel 64 may provide instructions to the processing elements 22 of the processor 12. A decoder 66 (e.g., decoder circuitry) included in the processing element 22 may decode received instructions, and an execution unit 68 (e.g., circuitry included in the processing element 22) may execute a decoded instruction to perform one or more operations, such as reading or writing a value to one of the registers 24.

In some cases, the application 20 may cause a system call to occur. For example, if the application 20 were to request that the OS kernel 64 cause the OS 18 or processor 12 to provide a service for the application (e.g., provide access the storage device 16 or schedule a task to be performed by the processor 12), a system call may take place. Performing system calls may reduce the efficiency of a processor. For instance, the processor 12 may have to switch from operating in the user mode to operating in a kernel mode in order to address the request before switching back to operating in the user mode. More specifically, the system call may be an interrupt or trap that causes the OS kernel 64 to change from operating in user mode to operating the kernel mode. Once in kernel mode, the OS kernel 64 may address the request made by the application 20. That is, performing a system call may cause the processor 12 to stop performing processes associated with the user mode (e.g., processes related to the applications 20), which may reduce the efficiency of the processor 12 because more time could be needed to complete the processes the processor 12 was processing prior to the system call.

In addition to the OS kernel 64, the kernel mode software components may also include one or more kernel APIs 70, which may be drivers that provide software (e.g., applications 20) an interface to hardware, such as the processor 12 or memory 14. As discussed herein, the kernel API 70 and OS API 62 may cause registers 24 to be read and written without performing a system call. For instance, as described below, when an application requests access to a particular feature (e.g., provided by a particular instruction set architecture), the OS API 62 and kernel API 70 may cause one or more registers 24 to be checked (e.g., read) or modified (e.g., written) without a system call being performed.

Returning to FIG. 1, the data registers 26 may include one or more user feature control registers 32, and the model specific registers 30 may include one or more kernel feature control registers 36. The user feature control register 32 and kernel feature control register 36 may each include bits that represent a particular feature and type of processing element 22 (e.g., a type of core included in the processor 12). In some embodiments, for the user feature control register 32, the bits may only be those that are included in the feature enable mask register 34, for example. This acts to enable the application 20 to only be able to utilize a subset of functions that the OS 18 determines that the application 20 may use. Accordingly, by changing a value of one or more bits in the user feature control register 32 and the kernel feature control register 36, the software being executed on the processor 12 may be able to opt into and out of various features provided by instruction set architectures of the processing elements 22A-C. That is, processing elements 22A-C may be able to provide or stop providing specific features or functions after one or more values of the user feature control register 32 and the kernel feature control register 36 are modified.

Continuing with the discussion of the registers 24, the model specific registers 30 may also include one or more feature status registers 38. The feature status register 38 provides information regarding hardware error information and software available bits that enable software to provide its own error information regarding a fault. For example, as will be elaborated upon below with respect to FIG. 3, when instructions are received to read or modify a value of a bit of the user feature control register 32 or the kernel feature control register 36, the feature status register 38 may provide information regarding whether the instructions were successfully implemented or resulted in an error, such as a fault. Furthermore, it should be noted that while the feature status register 38 is described as being included in the model specific registers 30, it should be noted that, in other embodiments, the feature status register 38 may be included in the data registers 26.

Figure 3:
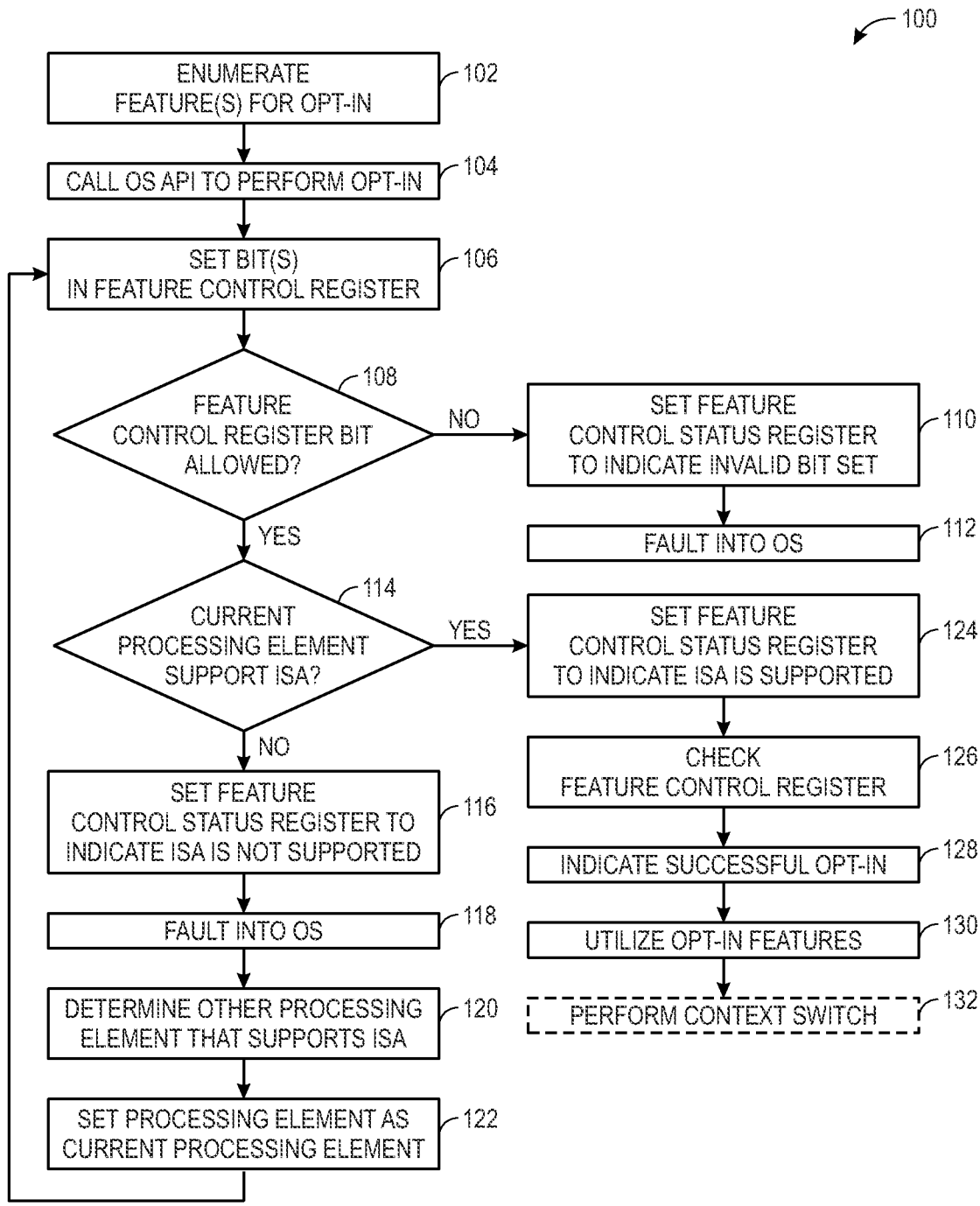
FIG. 3 is a flow diagram of a process for opting into a feature (e.g., an instruction set architecture), in accordance with an embodiment.

Continuing with the drawings, FIG. 3 is a flow chart of a process 100 for opting into a feature (e.g., a feature supported by a particular instruction set architecture). The process 100 may be performed by the processor 12 by executing instructions stored on the memory 14 of the storage device 16, such as the OS 18 and the application 20. More specifically, the process 100 may be performed using software components executed by the processor 12 and hardware components of the processor 12 (e.g., processing elements 22A-C) or the system 10 (e.g., memory 14).

At process block 102, the application 20 may enumerate features to opt into. For example, the application 20 may determine features (e.g., instruction set architectures) that can be provided by the processing elements 22A-C and request to utilize one of more of the features. As a more specific example, the application 20 may request an opt-in to Intel® Advanced Vector Extensions 512 (AVX-512), which is an example of extension (or extensions) to an instruction set architecture (e.g., x86 instruction set architecture), so that the application may utilize AVX-512.

At process block 104, the application 20 may call the OS API 62 to request to opt in to a particular feature. For example, continuing with the example of an opt-in for AVX-512, the application 20 may call the OS API 62 to request an opt-in to AVX-512.

At process block 106, the OS API 62 may set one or more bits of the user feature control register 32 corresponding to the one or more features being opted into. In other words, the OS API 62 may modify values of one or more bits to enable a requested feature to be provided. For example, the OS API 62 may set one or more bits of the user feature control register 32 to enable a processing element 22 to utilize AVX-512.

As noted above, the OS API 62 may set the one or more bits of the user feature control register 32 without a system call taking place. In other words, the OS API 62 may cause bits of the user feature control register 32 to be modified without intervention by the OS kernel 64.

At decision block 108, the execution unit 68 (or control circuitry included in the processor 12) may determine whether the one or more bits set at process block 106 are allowed to be set. For example, the execution unit 68 (or control circuitry included in the processor 12) may determine that the OS 18 has prohibited the current processing element 22 from providing the requested features (e.g., as may be indicated in the feature enable mask register 34), in which case one or more bits of the feature control register may not be allowed to be set to a requested value. When it is determined that one or more bits are not permitted to be set (e.g., to a value requested by the application 20), at process block 110, the execution unit 68 may cause the feature status register 38 to indicate that an invalid bit was set (e.g., provide an invalid bit status) and/or that an invalid bit was attempted (e.g., the application 20 requested an unpermitted bit to be modified). Moreover, at process block 112, a fault may occur, in which case the OS 18 (e.g., via the OS kernel 64) may determine how to resolve the fault. For example, based on feature status register 38, the OS kernel 64 may terminate the process 100, return with an error, or perform another action. For instance, in some cases, the OS kernel 64 may update the feature enable mask register 34 to allow the one or more bits to be set, in which case the process 100 may return to process block 106 to continue to decision block 114.

If at decision block 108 it is determined that the one or more bits of the feature control register are allowed to be set, at decision block 114, the execution unit 68 (or control circuitry included in the processor 12) may determine whether a current processing element supports the requested feature(s). For instance, the decoder 66 of the processing element 22 executing the application 20 (i.e., the current processing element) may receive instructions from the OS API 62 to modify one or more bits of the user feature control register 32 so that the current processing element 22 will provide a particular feature (e.g., AVX-512). The execution unit 68 may determine whether the current processing element 22 supports the requested feature by checking the feature enable mask register 34 of the current processing element 22 to determine whether the requested feature can be provided.

If the execution unit 68 determines that the current processing element 22 does not support a requested feature (e.g., an instruction set architecture), at process block 116, the execution unit 68 may cause the feature status register 38 to indicate that the requested feature or instruction set architecture is not supported by the current processing element 22. For example, bits of the user feature control register 32 may not be modified, and the feature status register 38 may return a value indicating that the requested bits were not modified. The indication may be a fault that particularly indicates that the requested feature is not supported by the current processing element. For example, in response to feature status register returning a value indicating that the request bits were not modified, at process block 118, a fault may occur, in which case the OS 18 (e.g., via the OS kernel 64) may resolve the fault.

For example, at process block 120, the OS kernel 64 may determine a processing element 22 that supports or that can provide the requested features. More specifically, the OS API 62 may check the user feature control register 32 to determine whether the requested bits were modified or determine whether the feature status register 38 indicates whether requested modifications (e.g., changes to bit values) were implemented. When the OS API 62 determines that the requested bits were not modified (i.e., the requested features were not successfully opted into), a fault may occur. In response to the fault, the OS API 62 may perform a system call, and the OS kernel 64 may resolve the fault. For instance, the OS kernel 64 may determine another processing element 22 of the processor 12 that can provide the requested features, and, at process block 122, the OS kernel 64 may set another processing element that supports the requested feature as the current processing element, and the process 100 may return to process block 106 (e.g., by restarting the instruction to set one or more bits of a feature control register). Continuing with the example of opting into AVX-512, if the current processing element 22 does not support AVX-512 (or is prohibited by the OS 18 from providing AVX-512), another processing element 22 that can provide AVX-512 may be determined (e.g., based on the bits of the feature enable mask register and/or the bits of the user feature control register 32 utilized by another processing element 22), and the other processing element 22 may be set as the current processing element. More particularly, the process (e.g., software thread) may be rescheduled (e.g., by the execution unit 68) to the processing element 22 that supports the requested feature. Additionally, the feature status register 38 may be cleared for future use. For example, after another processing element is set as the current processing element, the feature status register 38 may be cleared before restarting the instruction to set the bits of the feature control register of the new current processing element.

If, at decision block 114, the execution unit 68 determines that the current process element supports the requested feature (e.g., instruction set architecture), then, at process block 124, the execution unit 68 will cause the bits of user feature control register 32 associated with the requested feature to be modified. Additionally, the feature status register 38 may indicate that the bits were successfully modified.

At process block 126, the OS API 62 may check the feature status register to determine whether the bits of the user feature control register 32 associated with the requested features were modified, for example, by checking the feature status register 38 for an indication of whether the bits of the user feature control register 32 were modified. Because the current processing element supports the requested features (as determined at decision block 114), the feature status register 38 should indicate that the bits associated with the requested feature were modified, signifying that the current processing element 22 is now capable of providing the requested feature (e.g., AVX-512). Moreover, at process block 128, the OS API 62 may indicate to the application 20 that the opt-in for the requested features was successful. Additionally, at process block 130, the application 20 may utilize the features opted into. For example, the application may use AVX-512.

As indicated by process block 132, in some embodiments, a context switch may occur after a feature has been opted into. A context switch refers to a situation in which the current processing element 22 changes from being utilized to perform one process (e.g., a software thread, such as performing an operation associated with the application 20) to performing another process. After the context switch, the original process may be resumed (e.g., via another context switch or by utilizing another processing element 22).

Figure 4:
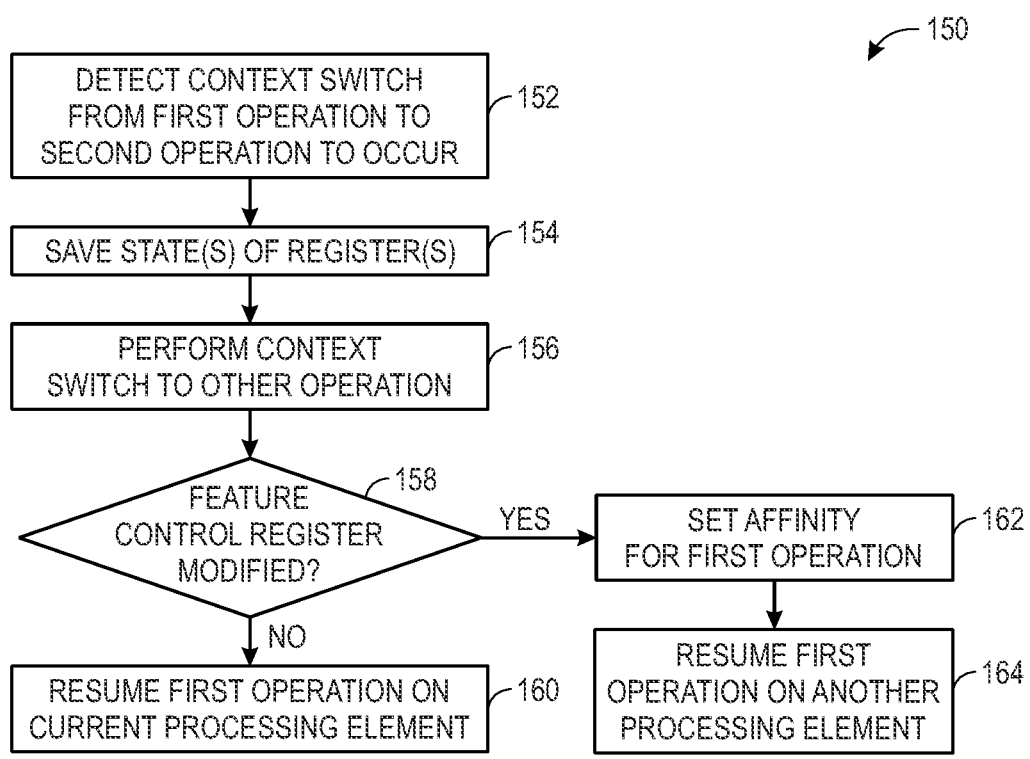
FIG. 4 is a flow diagram of a process for performing a context switch, in accordance with an embodiment.

To help provide more context for how context switches may be treated, FIG. 4 is provided. In particular, FIG. 4 is a process 150 for handling context switches that may be performed by the processor 12 by executing software instructions (e.g., the OS 18 and the applications 20.)

At process block 152, the occurrence of a context switch may be detected. For example, a processing element 22 may switch from performing a first operation (e.g., associated with the application using an opted into feature) to a second, different operation.

At process block 154, states of the registers 24 may be saved. In particular, states of the user feature control register 32, kernel feature control register 36, and the feature status register 38 associated with or used by the current processing element 22 may be saved. In some embodiments, the operations associated with process block 154 may be performed during performance of the operations of process block 152. At process block 156, the context switch may take place. For instance, the current processing element 22 may switch from performing one process (e.g., software thread) to another process (e.g., a different software thread).

In the context of resuming the original process, the OS API 62 or OS kernel 64 may determine whether the user feature control register 32, kernel feature control register 36, or both have been modified (e.g., based on the particular context switch that occurred and whether the first operation is associated with user mode or kernel mode). When it is determined that a feature control register (e.g., user feature control register 32 or kernel feature control register 36) has not been modified, the processing element 22 that was performing the first operation before the context switch occurred may resume performing the first operation. More specifically, the earlier values of the bits of the registers 24 being stored in the memory 14 may be restored in the registers 24 (e.g., bits of the application register 28) to the values associated with the first operation, and the processing element 22 may resume performing the first process.

However, if at decision block 158 it is determined that a feature control register was modified (e.g., a feature originally opted into was opted out of), an affinity for the first process may be set at process block 162. In other words, the processor 12 may prioritize resuming the first operation but on a different processing element. At process block 164, the first operation may be resumed on another processing element. For example, to resume the first operation on another processing element 22, operations described with regard to process blocks 116, 118, 120, and 122 may be performed, a feature may be opted into on the different processing element, and the different processing element 22 may be utilized to perform the first operation.

While the process 100 and process 150 are described in the context of the application 20 opting in to a feature, it should be noted that the process 100 and process 150 may be performed when an opt in occurs while operating in a kernel mode. For example, the kernel API 70 may be utilized to opt in to features when operating in kernel mode by causing one or more bits of the kernel feature control register 36 to be modified in a similar manner as described above with respect to the user feature control register 32. Additionally, it should be noted that similar processes may be performed to opt out of a feature. For example, to opt out of a feature, the application 20 may enumerate features that the application no longer 20 wants to use (e.g., features to opt out of), which may call the OS API 62 to perform an opt-out. The OS API 62 may cause bits of the user feature control register 32 to be modified (e.g., to opt-out values), for example, by providing instructions to the decoder 66 and having the execution unit 68 instruct the bits of the user feature control register 32 to be modified. The feature status register 38 may return a value indicating that the bits were successfully modified. The OS API 62 may check the value provided by the feature status register 38 to confirm that the bits were modified, thereby indicating that the features have been opted out of. The OS API 62 may also indicate to the application 20 that the features have been opted out of (e.g., a successful opt-out).

Additionally, while the process operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

Furthermore, while opting into and out of features is described above in the context of a single processor (e.g., processor 12), the techniques described herein may be applied to systems that include multiple processors, for instance, that are communicatively coupled to one another. For example, in a system that includes two processors, one processor may be able to provide a first instruction set architecture (e.g., that corresponds to a first feature), and another processor may provide a second instruction set architecture corresponding to a second feature. A program (e.g., application used while a processor is operating in user mode or software that is used while the processor is operating in kernel mode) that is being executed on a first processor may request to use an instruction set architecture (e.g., a feature). When the first processor does not support the requested instruction set architecture and the second processor supports the requested instruction set architecture, the process (e.g., programming thread requesting a particular determination or calculation that needs an opt-in to be performed) may be provided to the second processor, an opt-in may be performed on the second processor. After the opt-in, the second processor may perform the process (e.g., software thread).

Accordingly, the techniques discussed herein may enable software executed on one or more processors to opt-in and opt-out of features without using system calls, for instance, when the software is being executed by a processor or portion thereof that can provide a requested feature. For example, both software associated with a user mode of a processor and software associated with a kernel mode of the processor may cause values bits of feature control registers of the processor to enable and disable particular features (e.g., instruction set architectures). Because no system call is needed to enable the software to utilize a requested feature, the number of system calls that occur on the processor may be reduced, which may enable the processor to operate more efficiently.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). For any claims containing elements designated in any other manner, however, it is intended that such elements are not to be interpreted under 35 U.S.C. 112(f).

The following numbered clauses define certain example embodiments of the present disclosure.

Clause 1

A processor, comprising:
one or more processing elements associated with one or more instruction set architectures;
wherein the processor is configured to:
receive a request from an application executed by a first processing element of the one or more processing elements to enable a feature associated with an instruction set architecture; and
enable the application to utilize the feature without a system call occurring when the feature is associated with an instruction set architecture associated with the first processing element.

Clause 2

The processor of clause 1, wherein:
the one or more processing elements comprises a second processing element;
the first processing element is associated with a first subset of the one or more instruction set architectures; and
the second processing element is associated with a second subset of the one or more instruction set architectures that is different than the first subset of the one or more instruction set architectures.

Clause 3

The processor of clause 2, comprising:
a feature enable mask register comprising a plurality of bits indicative of a plurality of features an operating system executed by the processor will permit the application to utilize, wherein the plurality of features comprises the feature; and
a feature control register comprising at least one bit indicative of whether the first processing element is currently configured to enable the application to utilize the feature.

Clause 4

The processor of clause 3, wherein the processor is configured to:
determine whether the first processing element can provide the feature based on the plurality of bits of the feature enable mask register; and
enable the application to utilize the feature by causing a change to at least one bit value of the at least one bit of the feature control register.

Clause 5

The processor of clause 4, comprising a feature status register configured to indicate whether the change to the at least one bit value occurred.

Clause 6

The processor of clause 4, wherein, in response to determining that the first processing element cannot provide the feature, the processor is configured to:
determine whether the second processing element can provide the feature;
cause a software thread associated with the request to be addressed by the second processing element; and
cause the second processing element to provide the feature.

Clause 7

The processor of clause 4, wherein the processor is configured to:
begin processing a first software thread associating with the application using the first processing element after the application has been enabled to use the feature;
process a second software thread using the first processing element;
determine whether the first processing element is configured to enable the application to utilize the feature based on a current value of the at least one bit of the feature control register; and
resume processing the first software thread.

Clause 8

The processor of clause 7, wherein the processor is configured to resume processing the first software thread by:
utilizing the first processing element upon determining that the first processing element is configured to enable the application to utilize the feature; and
utilizing the second processing element upon determining that the first processing element is not configured to enable the application to utilize the feature.

Clause 9

The processor of clause 1, wherein:
the processor comprises a microprocessor; and
the one or more processing elements comprise one or more cores of the microprocessor.

Clause 10

A non-transitory, computer-readable medium comprising instructions that, when executed, are configured to cause a processor to:
receive a request from an application executed by a first processing element of the processor to enable a feature supported by an instruction set architecture, wherein the first processing element is associated with a first instruction set architecture, wherein a second processing element of the processor is associated with a second instruction set architecture; and
enable the application to utilize the feature without a system call occurring when the feature is supported by the first instruction set architecture.

Clause 11

The non-transitory, computer-readable medium of clause 10, wherein the processor comprises one or more user mode registers associated with a user mode of the processor and one or more model specific registers associated with a kernel mode of the processor.

Clause 12

The non-transitory, computer-readable medium of clause 11, wherein:

the one or more model specific registers comprise a feature enable mask register comprising a plurality of bits indicative of a plurality of features an operating system executed by the processor will permit the application to utilize, wherein the plurality of features comprises the feature; and the one or more user mode registers comprise a feature control register comprising at least one bit indicative of whether the first processing element is currently configured to provide the feature when the processor is operating in the user mode.

Clause 13

The non-transitory, computer-readable medium of clause 12, wherein the one or more model specific registers comprise a kernel feature control register comprising one or more bits indicative of whether the first processing element is currently configured to provide the feature when the processor is operating in the kernel mode.

Clause 14

The non-transitory, computer-readable medium of clause 12, wherein the instructions are configured to cause the processor to determine whether the first processing element supports the feature based on at least one bit value of the plurality of bits.

Clause 15

The non-transitory, computer-readable medium of clause 10, wherein the instructions, when executed, are configured to cause a fault to occur when the first processing element does not support the feature or has not been configured to enable the application to utilize the feature.

Clause 16

The non-transitory, computer-readable medium of clause 10, wherein the application is a user mode application.

Clause 17

A processor-implemented method, comprising:
receiving a request to utilize a feature associated with an instruction set architecture, wherein the request comprises or is included in a software thread;
in response to receiving the request, requesting, via an application programming interface, modification of a bit of a register associated with the feature without performing a system call;
determining whether a processing element that is processing the software thread supports the feature; and
when the processing element supports the feature, permitting the feature to be utilized by an application by causing the bit of the register to be modified.

Clause 18

The processor-implemented method of clause 17, comprising:
determining, by the application programming interface, whether the bit has been modified; and
providing an indication to the application that sent the request that the application may utilize the feature.

Clause 19

The processor-implemented method of clause 17, comprising determining whether the bit has been modified by determining whether one or more bits of a second register are indicative of the bit having been modified.

Clause 20

The processor-implemented method of clause 17, wherein the processing element comprises a core of a processor.

What is claimed is:

1. A processor, comprising:
a plurality of processing elements associated with heterogeneous instruction set architectures, wherein the plurality of processing elements comprises at least a first processing element associated with a first instruction set architecture and a second processing element associated with a different instruction set architecture;
wherein the processor is configured to:
receive, while operating in a user mode of operation and via an application programming interface (API), a request from an application executed by the first processing element of the plurality of processing elements to enable a feature associated with an instruction set architecture of the heterogeneous instruction set architectures;
based on the first processing element supporting the feature and an operating system permitting the application to utilize the feature, enabling while remaining operating in the user mode of operation, the application to utilize the feature provided by the first processing element; and
based on the first processing element not supporting the feature or the operating system not permitting the application to utilize the feature, enter a kernel mode of operation to determine whether the second processing element can provide the feature.

2. The processor of claim 1, wherein the processor comprises a kernel mode register comprising a plurality of values indicative of a plurality of features the operating system will permit the application to utilize, wherein the plurality of features comprises the feature.

3. The processor of claim 2, wherein the processor is configured to determine whether the operating system will permit the application to utilize the feature based on the plurality of values.

4. The processor of claim 1, wherein, after entering the kernel mode of operation, the processor is configured to enable the application to utilize the feature by:
determining the second processing element of the processor can provide the feature;
causing a software thread associated with the request to be addressed by the second processing element; and
causing the second processing element to provide the feature.

5. The processor of claim 1, wherein the processor is configured to:
begin processing a first software thread associating with the application using the first processing element after the application has been enabled to use the feature;
context switch out the first software thread in order to process a second software thread;
process the second software thread using the first processing element;
determine whether the first processing element is configured to enable the application to utilize the feature when resuming the first software thread; and
resume processing the first software thread.

6. The processor of claim 5, wherein the processor is configured to resume processing the first software thread by:
utilizing the first processing element upon determining that the first processing element is configured to enable the application to utilize the feature; and
utilizing the second processing element of the processor upon determining that the first processing element is not configured to enable the application to utilize the feature.

7. The processor of claim 1, wherein:
the processor comprises a microprocessor; and
the plurality of processing elements comprise a plurality of cores of the microprocessor.

8. A processor-implemented method implemented in a processor having a plurality of processing elements associated with heterogeneous instruction set architectures, wherein the plurality of processing elements comprises at least a first processing element associated with a first instruction set architecture and a second processing element associated with a different instruction set architecture, the processor- implemented method, comprising:
- receiving by the processor, while operating in a user mode of operation and via an application programming interface (API), a request from an application executed by the first processing element of the plurality of processing elements to enable a feature associated with an instruction set architecture of the heterogeneous instruction set architectures;
- based on the first processing element supporting the feature and an operating system permitting the application to utilize the feature, enabling while remaining operating in the user mode of operation, the application to utilize the feature provided by the first processing element; and
- based on the first processing element not supporting the feature or the operating system not permitting the application to utilize the feature, entering a kernel mode of operation to determine whether the second processing element can provide the feature.

9. The processor-implemented method of claim 8, wherein enabling the application to utilize the feature comprises causing, by the processor while operating in the user mode of operation, a bit of a register associated with the feature to be modified.

10. The processor-implemented method of claim 9, comprising:
- determining, by the application programming interface, whether the bit has been modified; and
- providing an indication to the application that sent the request that the application may utilize the feature.

11. The processor-implemented method of claim 10, comprising determining whether the bit has been modified by determining whether one or more bits of a second register are indicative of the bit having been modified.

12. The processor-implemented method of claim 9, comprising determining, while in the user mode of operation, whether an operating system will permit the application to utilize the feature.

13. The processor-implemented method of claim 12, when the operating system will permit the application to utilize the feature and the processing element supports the feature, enabling the feature to be utilized by the application by causing the bit of the register to be modified.

14. The processor-implemented method of claim 8, wherein the feature is the instruction set architecture.

15. A non-transitory computer-readable medium comprising instructions that, when executed by a processor having a plurality of processing elements associated with heterogeneous instruction set architectures, wherein the plurality of processing elements comprises at least a first processing element associated with a first instruction set architecture and a second processing element associated with a different instruction set architecture, cause the processor to:
- receive, while operating in a user mode of operation and via an application programming interface (API), a request from an application executed by the first processing element of the plurality of processing elements to enable a feature associated with an instruction set architecture of the heterogeneous instruction set architectures;
- based on the first processing element supporting the feature and an operating system permitting the application to utilize the feature, enabling while remaining operating in the user mode of operation, the application to utilize the feature provided by the first processing element; and
- based on the first processing element not supporting the feature or the operating system not permitting the application to utilize the feature, enter a kernel mode of operation to determine whether the second processing element can provide the feature.

16. The non-transitory computer-readable medium of claim 15, wherein after entering the kernel mode of operation, the instructions, when executed, cause the processor to:
- enable the application to utilize the feature by:
    - determining the second processing element of the processor can provide the feature;
    - causing a software thread associated with the request to be addressed by the second processing element; and
    - causing the second processing element to provide the feature.

* * * * *